United States Patent
Akopyan et al.

(10) Patent No.: US 9,747,545 B2
(45) Date of Patent: Aug. 29, 2017

(54) SELF-TIMED, EVENT-DRIVEN NEUROSYNAPTIC CORE CONTROLLER

(71) Applicant: International Business Machines Corporation, Armonk, NY (US)

(72) Inventors: Filipp A. Akopyan, New Windsor, NY (US); Rodrigo Alvarez-Icaza Rivera, Mountain View, CA (US); John V. Arthur, Mountain View, CA (US); Andrew S. Cassidy, San Jose, CA (US); Bryan L. Jackson, Fremont, CA (US); Paul A. Merolla, Palo Alto, CA (US); Dharmendra S. Modha, San Jose, CA (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 14/491,824

(22) Filed: Sep. 19, 2014

(65) Prior Publication Data

US 2016/0086077 A1   Mar. 24, 2016

(51) Int. Cl.
*G06N 3/063* (2006.01)
*G06N 3/04* (2006.01)

(52) U.S. Cl.
CPC .............. *G06N 3/063* (2013.01); *G06N 3/049* (2013.01)

(58) Field of Classification Search
None
See application file for complete search history.

(56) References Cited

U.S. PATENT DOCUMENTS

2011/0004742 A1   1/2011   Hassan
2013/0073497 A1   3/2013   Akopyan et al.

FOREIGN PATENT DOCUMENTS

EP        2587335 A2    1/2013

OTHER PUBLICATIONS

Hafliger, Asynchronous Event Redirecting in Bio-Inspired Communication, International Conference on Electronics, Circuits and Systems, vol. 1, 2001, pp. 87-90.*
Dean, M.E., "Self-Timed Logic Using Current Sensing Completion Detection", IP.com, May 1, 1993, pp. 1-5, vol. 36, No. 5, IBM Technical Disclosure Bulletin, United States.
Klim, P.J., et al., Procedure and Design to Facilitate Self Timed Implementations of Combinational Logic, IP.com, May 1, 1994, pp. 1-5, vol. 37, No. 5, IBM Technical Disclosure Bulletin, United States.

* cited by examiner

*Primary Examiner* — Wilbert L Starks
(74) *Attorney, Agent, or Firm* — Sherman IP LLP; Kenneth L. Sherman; Hemavathy Perumal

(57) ABSTRACT

Embodiments of the invention relate to a system for controlling program execution. The system comprises an event-based core controller including a set of state-preserving elements. The core controller starts and stops the program execution based on one or more control signals. For each instruction of the program, the core controller triggers a target component to execute the instruction by generating and sending an instruction and/or a trigger pulse to the target component.

18 Claims, 12 Drawing Sheets

SELF-TIMED, EVENT-DRIVEN NEUROSYNAPTIC CORE CONTROLLER

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, a self-timed, event-driven controller for a neurosynaptic core circuit.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

One embodiment of the invention provides a system for controlling program execution. The system comprises an event-based core controller including a set of state-preserving elements. The core controller starts and stops the program execution based on one or more control signals. For each instruction of the program, the core controller triggers a target component to execute the instruction by generating and sending an instruction and/or a trigger pulse to the target component.

Another embodiment of the invention provides a method for controlling program execution. The method comprises starting and stopping the program execution based on one or more control signals, and, for each instruction of the program, triggering a target component to execute the instruction by generating and sending an instruction and/or a trigger pulse to the target component. The program execution is controlled via an event-based core controller including a set of state-preserving elements.

These and other features, aspects and advantages of the present invention will become understood with reference to the following description, appended claims and accompanying figures.

DETAILED DESCRIPTION

Embodiments of the invention relate to neuromorphic and synaptronic computation, and in particular, a self-timed, event-driven controller for a neurosynaptic core circuit. One embodiment of the invention provides a system for controlling program execution. The system comprises an event-based core controller including a set of state-preserving elements. The core controller starts and stops the program execution based on one or more control signals. For each instruction of the program, the core controller triggers a target component to execute the instruction by generating and sending an instruction and/or a trigger pulse to the target component.

The term digital neuron as used herein represents framework configured to simulate a biological neuron. A digital synapse creates connections between processing elements that are roughly functionally equivalent to neurons of a biological brain. As such, a neuromorphic and synaptronic computation comprising digital neurons according to embodiments of the invention may include various electronic circuits that are modeled on biological neurons. Further, a neuromorphic and synaptronic computation comprising digital neurons according to embodiments of the invention may include various processing elements (including computer simulations) that are modeled on biological neurons. A neuromorphic and synaptronic computation according to embodiments of the invention can be implemented as a neuromorphic and synaptronic framework comprising circuitry, and additionally as a computer simulation.

Indeed, embodiments of the invention can take the form of an entirely hardware embodiment, an entirely software embodiment or an embodiment containing both hardware and software elements.

Figure 1:
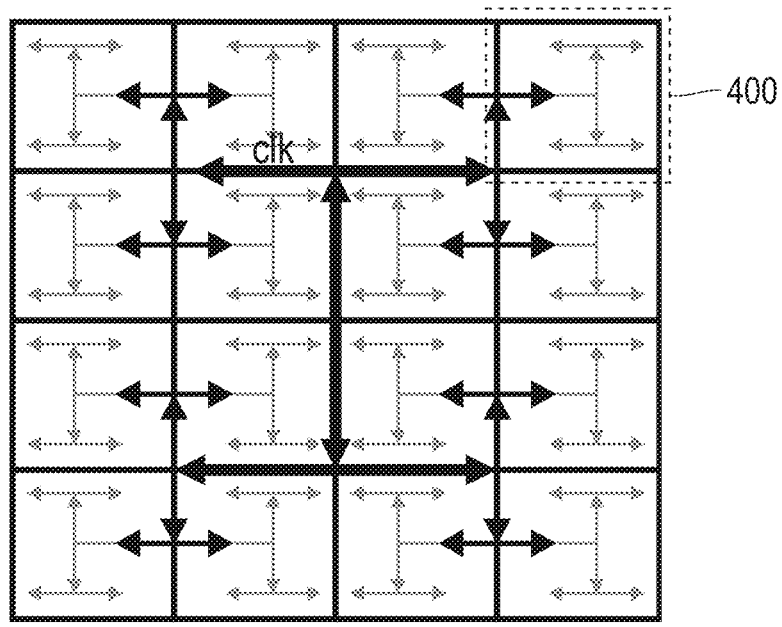
FIG. 1 illustrates a high-speed global clock distribution network.
Figure 7:
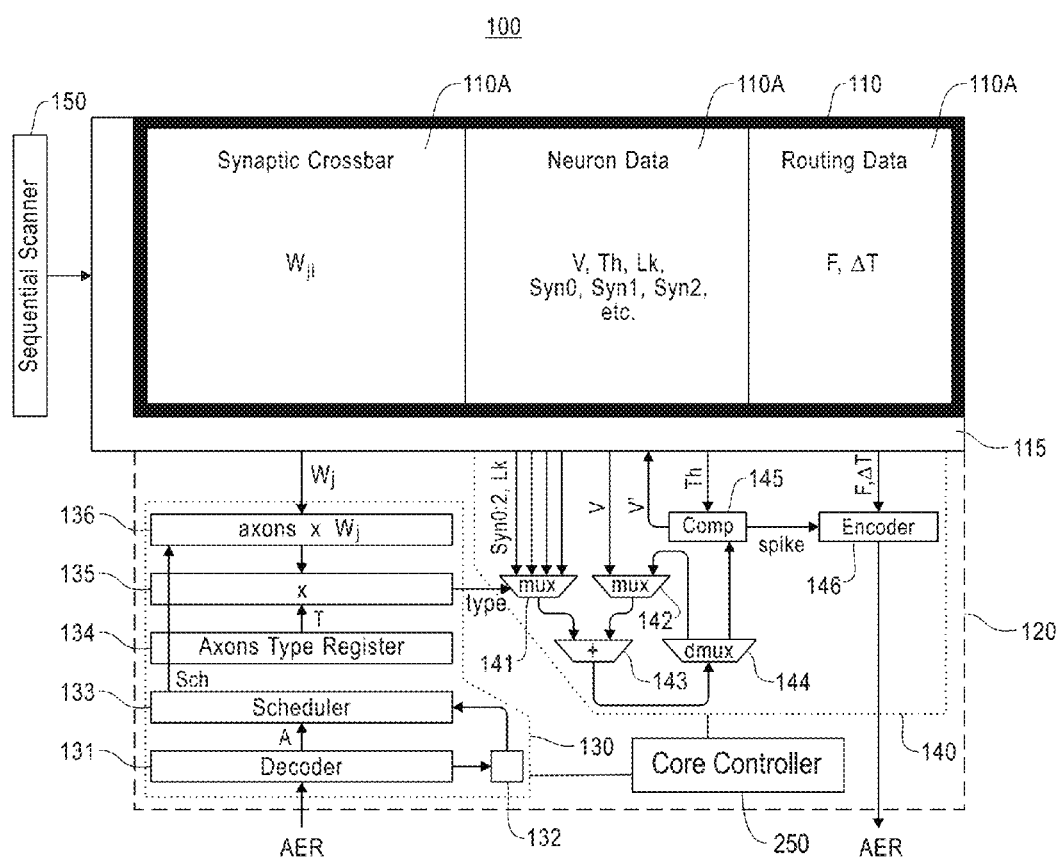
FIG. 7 illustrates a multiplexed neural core circuit, in accordance with an embodiment of the invention.

FIG. 1 illustrates a high-speed global clock distribution network 350. The network 350 globally distributes clock signals to multiple leaf circuits. Each leaf circuit represents a target component 400. In this specification, a target component 400 may be a low-level component such as a flip-flop or a latch, or a higher-level synchronous circuit block. For example, a target component 400 may be a component of a multiplexed neurosynaptic core circuit 100 (FIG. 7).

The network 350 consumes a lot of electrical power when globally transmitting/distributing a fast switching clock signal to each leaf circuit. The minimum amount of power consumption required to drive the entire network 350 is proportional to $f*C*V^2$, wherein f denotes clock frequency, C denotes capacitance of the network 350, and V denotes operating voltage.

Figure 2:
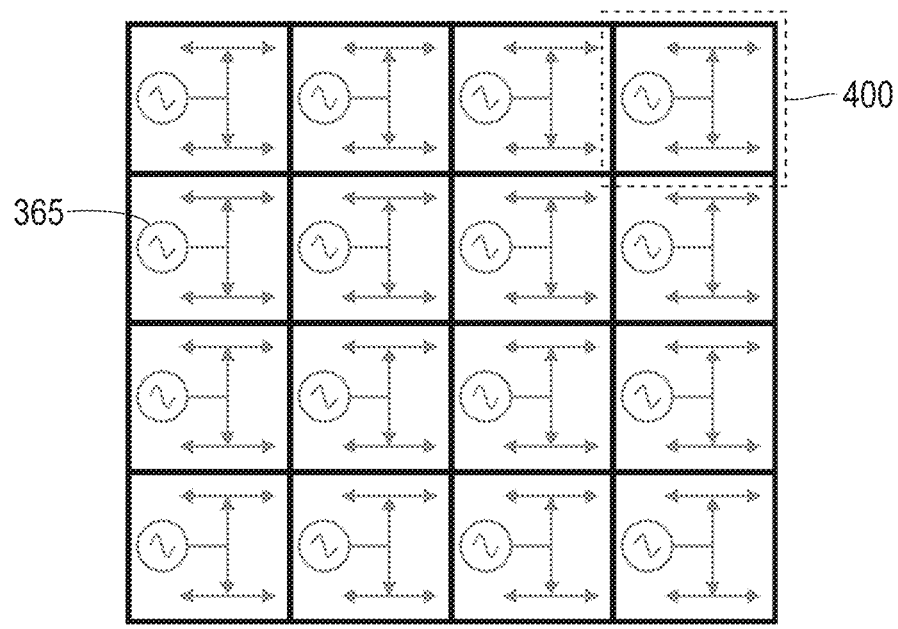
FIG. 2 illustrates a high-speed global clock distribution network including phase-locked loops (PLLs)

FIG. 2 illustrates a high-speed global clock distribution network 360 including phase-locked loops (PLLs). The network 360 globally distributes slower clock signals to multiple leaf circuits. Each leaf circuit represents a target component 400. Each leaf circuit implements a PLL. Specifically, each leaf circuit includes a voltage-controlled oscillator 365 that locally multiplies a frequency-scaled clock signal to a desired clock frequency. The PLLs, however, run continuously, thereby consuming active power even when idle instructions are triggered (i.e., the leaf circuits are not enabled). Although lower clock frequencies may be used to drive the PLLs, clock transitions must arrive within a very narrow temporal window at every leaf circuit, thereby implying a well-balanced clock distribution network preceding the PLLs.

Figure 3:
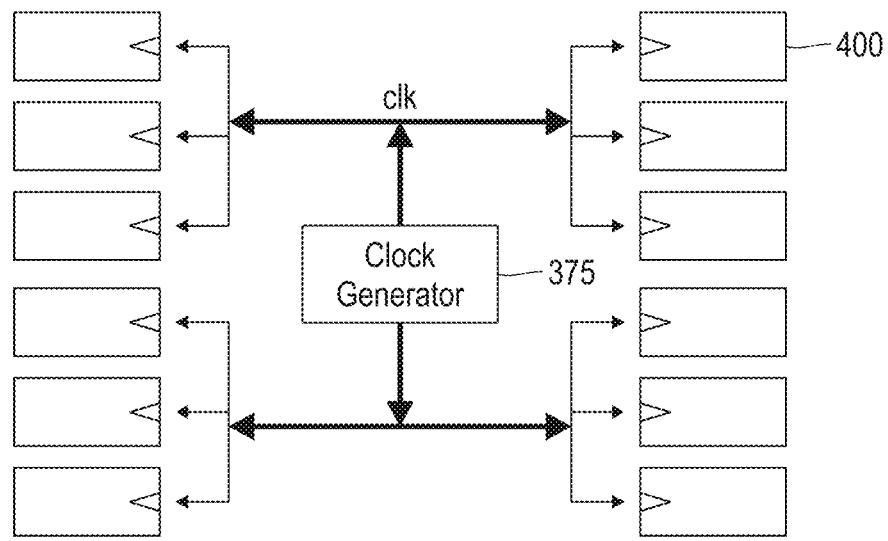
FIG. 3 illustrates a standard clock distribution network.

FIG. 3 illustrates a standard clock distribution network 370. The standard clock distribution network 370 comprises a clock generator 375 for generating and distributing clock signals to multiple leaf circuits. Each leaf circuit represents a target component 400. The entire network 370 continuously consumes active power, even when idle instructions are triggered.

Figure 4:
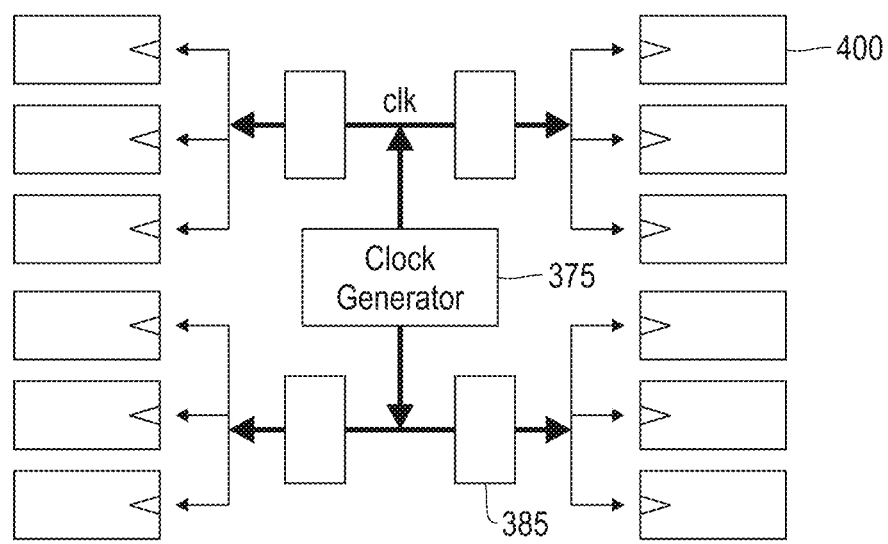
FIG. 4 illustrates a clock gating clock distribution network.

FIG. 4 illustrates a clock gating clock distribution network 380. The network 380 comprises a clock generator 375 for generating and distributing clock signals to multiple leaf circuits. Each leaf circuit represents a target component 400. The network 380 further comprises multiple clock gates 385, wherein each clock gate 385 is a high-level gating control circuit for synchronously switching states with clock signals. The network 380 may include additional components to prevent fatal clock glitches. Typically, only large blocks of leaf circuits are gated, thereby resulting in a very coarse reduction of power consumption and functionality.

Embodiments of the invention provide a self-timed, event-based core control system. In one embodiment, the self-timed, event-based core control system may reduce costs associated with power consumption and/or transistor/silicon area.

Figure 5:
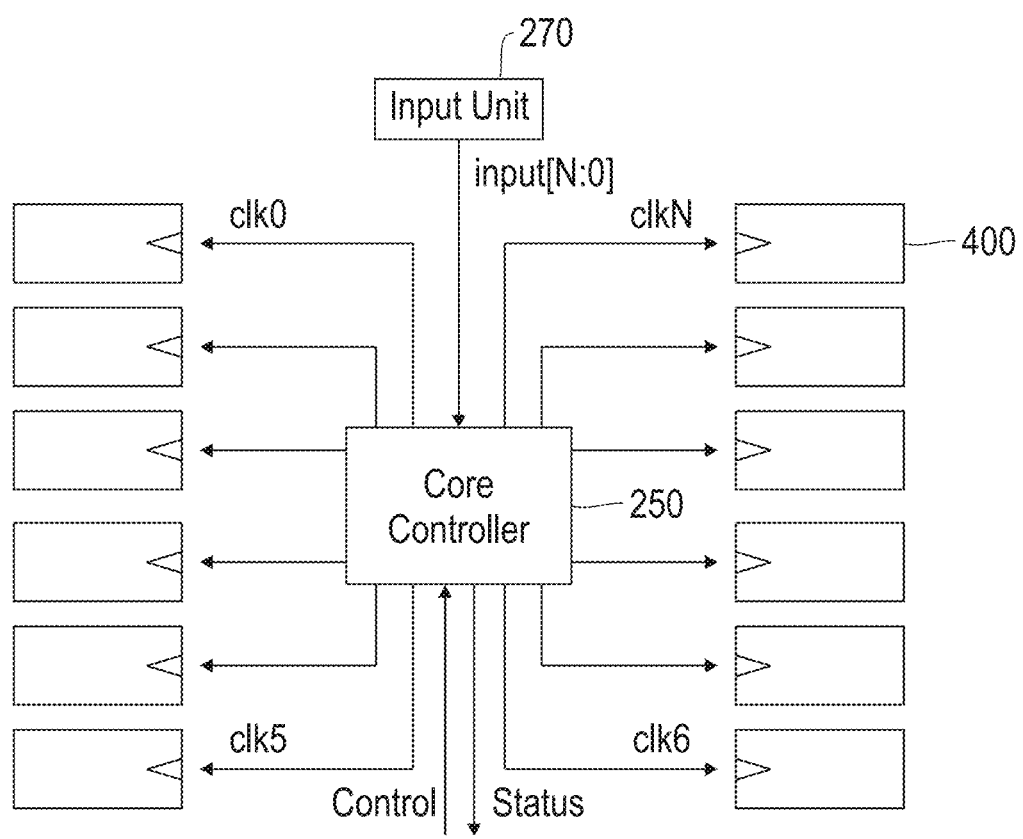
FIG. 5 illustrates an example self-timed, event-based core control system, in accordance with an embodiment of the invention.

FIG. 5 illustrates an example self-timed, event-based core control system 200, in accordance with an embodiment of the invention. The system 200 comprises a core controller 250 for controlling one or more target components 400. As stated above, a target component 400 may be a low-level component such as a flip-flop or a latch, or a higher-level component such as an asynchronous circuit block (if the target component 400 is an asynchronous circuit clock, a clock signal is replaced by handshaking signals) or a synchronous circuit block. For example, a target component 400 may be a component of a multiplexed neurosynaptic core circuit 100 (FIG. 7).

The controller 250 is event-driven and includes a set of state-preserving elements. For example, in one embodiment, the controller 250 includes one or more asynchronous shift elements. In another embodiment, the controller 250 includes one or more synchronous state-preserving elements.

The controller 250 generates a sequence of instruction pulses (i.e., trigger pulses) in a manner suitable for executing a program including instructions for triggering different target components 400 to perform different operations. In one embodiment, the controller 250 includes a pulse generator circuit for generating an independent instruction pulse (i.e., trigger pulse) that triggers a target component 400 to execute a desired operation. In another embodiment, the controller 250 generates multi-bit wide instructions instead of single instruction pulse.

Control signals used to instruct the controller 250 as to when to start, stop or resume execution of the program. The control signals may come from any component and/or circuit block of an overall system that the controller 250 is integrated into.

Each instruction pulse generated by the controller 250 may include a clock signal or handshaking signals used to trigger a corresponding target component 400 to perform a desired operation. In the system 200, a target component 400 is enabled only when it is triggered by an instruction pulse; the target component 400 remains dormant (i.e., not enabled) otherwise.

The duration of each instruction pulse for each target component 400 is based on one of the following: a local programmable delay element, or the amount of time it takes for the target component 400 to acknowledge that it has completed an operation that the instruction pulse triggered the target component 400 to perform.

For example, let N denote a positive integer, and let N+1 denote the total number of target components 400 that the controller 250 controls. The controller 250 generates a first instruction pulse clk0 for triggering a first target component 400, a second instruction pulse clk1 for triggering a second target component 400, a third instruction pulse clk2 for triggering a third target component 400, . . . , and an $(N+1)^{th}$ instruction pulse clkN for triggering an $(N+1)^{th}$ target component 400.

The controller 250 generates and transmits status reports indicating the progress of the execution of the program. For example, the controller 250 may generate an error status report when the controller 250 is enabled by a control signal.

The system 200 further comprises an input unit 270 for providing input data for target blocks and/or for the controller 250 itself. The controller 250 operation may vary depending on input data. For example, as shown in FIG. 5, the input unit 270 provides input[N:0]. Instructions for the target blocks may be generated based on the input data.

In one embodiment, one controller 250 integrated into an overall system may be used to perform all synchronization for, and/or send out all instructions to, components of the overall system. The controller 250 may use multiple states or shift elements, wherein each state or shift element may perform processing and computation functions as well as generate instruction pulses and clock signals for its target components 400.

In one example implementation, the controller 250 may be integrated into a neural core circuit 10 (FIG. 6) to control different components of the core circuit 10. The input data provided to the controller 250 may include synaptic inputs for neurons 11 (FIG. 6) of the core circuit 10.

Figure 6:
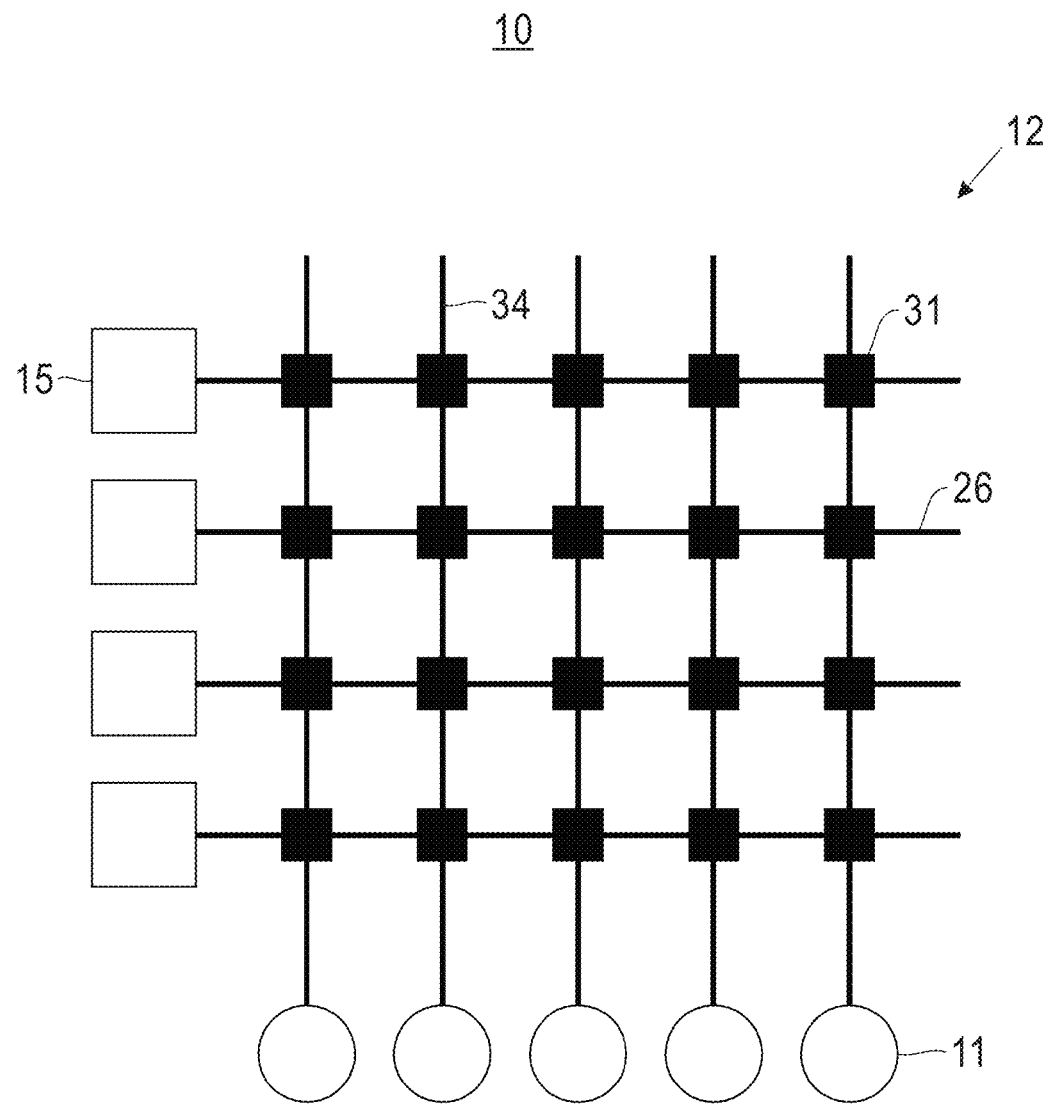
FIG. 6 illustrates a neural core circuit, in accordance with an embodiment of the invention.

FIG. 6 illustrates an example neural core circuit 10, in accordance with an embodiment of the invention. The neural core circuit 10 is a neurosynaptic core circuit. The core circuit 10 comprises a plurality of components including multiple pre-synaptic axons 15 and multiple post-synaptic neurons 11. Each neuron 11 has configurable operational parameters. The components of the core circuit 10 further include a synaptic crossbar 12 including multiple synapses 31, multiple rows/axon paths 26, and multiple columns/dendrite paths 34.

Each synapse 31 communicates firing events (e.g., spike events) between a pre-synaptic axon 15 and a post-synaptic neuron 11. Specifically, each synapse 31 is located at cross-point junction between an axon path 26 and a dendrite path 34. If a synaptic connection exists between an axon path 26 and a dendrite path 34, the synaptic connection is made through a synapse 31 located at cross-point junction between the axon path 26 and the dendrite path 34. Each axon 15 is connected to an axon path 26, such that said axon 15 sends spikes to the connected axon path 26. Each neuron 11 is connected to a dendrite path 34, such that said neuron 11 receives spikes from the connected dendrite path 34.

Each synapse 31 has a synaptic weight. The synaptic weights of the synapses 31 of the core circuit 10 may be represented by a weight matrix W, wherein an element of the matrix W represents a synaptic weight of a synapse 31 located at a row/axon path j and a column/dendrite path i of the crossbar 12. In one embodiment, the synapses 31 are binary memory devices. Each synapse 31 can have a weight "0" indicating that said synapse 31 is non-conducting, or a weight "1" indicating that said synapse 31 is conducting. A learning rule such as spike-timing dependent plasticity (STDP) may be applied to update the synaptic weights of the synapses 31.

As shown in FIG. 7, in another example implementation, a core controller 250 may be integrated into a multiplexed neurosynaptic core circuit 100 (FIG. 7) to control different components of the core circuit 100.

FIG. 7 illustrates an example multiplexed neural core circuit 100, in accordance with an embodiment of the invention. The core circuit 100 is a multiplexed neurosynaptic core circuit. The core circuit 100 represents a dedicated highly-parallel neural network. Specifically, the core circuit 100 multiplexes computation and control logic for multiple neurons. The core circuit 100 comprises a plurality of components including a memory device 110 for maintaining neuronal attributes for multiple time-multiplexed neurons. In one embodiment, the memory device 110 maintains the following neuronal attributes for each neuron: synaptic connectivity information ($W_{ji}$), neuron parameters, and routing information. The synaptic connectivity information may include synaptic weights. The neuron parameters may include one or more of the following: membrane potential variable (V), spike threshold (Th), leak rate (Lk), and weights of each possible axon type (Syn0, Syn1, Syn2). The routing information may include one or more of the following: fanout (F), and routing delay (ΔT). The memory device 110 further includes a memory interface circuit 115 (e.g., a standard memory interface circuit).

The components of the core circuit 100 further include a processing and computation logic circuit 120 for the memory device 110 and the neurons. The circuit 120 comprises an input processing fabric 130 and a computation fabric 140. In one embodiment, the processing fabric 130 comprises a decoder 131, a scheduler control unit 132, a scheduler 133, an axon type register 134, a multiplexing control unit 135, and a dot product module 136. The decoder 131 is configured for receiving and decoding firing events encapsulated in event packets. Firing events decoded from received event packets are buffered in the scheduler 133. In one embodiment, the scheduler 133 is a dual port memory including multiple rows and columns, wherein rows represent future time steps and columns represents axons 15. For each firing event, the scheduler control unit 132 controls which row and column of the scheduler 133 corresponding to proper spike delivery time the firing event is written to.

The dot product module 136 is configured to compute a dot product based on a vector representing active axons 15 in a current time step and one or more neuronal attributes read from the memory device 110. The axon type register 134 maintains different commands, and sends the computation fabric 140 commands based on the axon type (i.e., Syn0, Syn1, Syn2, etc.). Each command maintained corresponds to an index of the dot product computed by the dot product module 136. The multiplexing control unit 135 combines the dot product computed and firing events to generate information to send to the computation fabric 140.

In one embodiment, the computation fabric 140 comprises a first multiplexer 141, a second multiplexer 142, an adder 143, a demultiplexer 144, a comparator module ("comparator") 145, and an encoder 146. The first multiplexer 141 uses information provided by the multiplexing control unit 135 to select a neuron parameter. The adder 143 combines the neuron parameter selected by the first multiplexer 141 with a membrane potential variable selected by the second multiplexer 142. The comparator 145 determines whether the resulting membrane potential variable exceeds a threshold parameter Th. If the threshold parameter Th is exceeded, the encoder 146 generates a firing event and uses the fanout F and the routing delay ΔT information to encapsulate/encode the generated firing event into an event packet.

The core controller 250 integrated into the core circuit 100 directly or indirectly controls the different components of the core circuit 100. The core controller 250 orchestrates and synchronizes actions performed by the components of the core circuit 100. The controller 250 may be directly coupled to one or more components of the core circuit 100. For example, as shown in FIG. 7, the controller 250 may be directly coupled to one or more components of the processing and computation logic circuit 120 to orchestrate and synchronize actions performed by the processing and computation logic circuit 120.

The controller 250 may receive control signals from one or components of the core circuit 100, or an external communication environment. The controller 250 may also provide status reports to an external communication environment.

Figure 8:
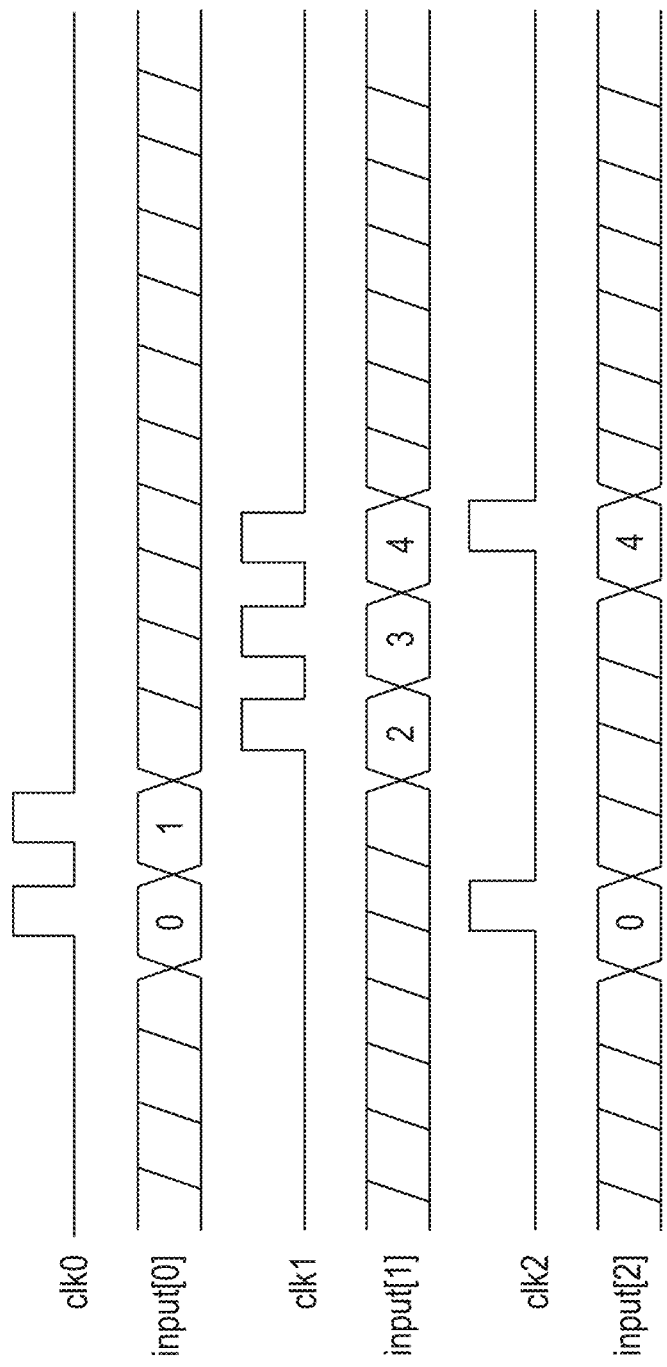
FIG. 8 illustrates different instruction pulses generated by the controller in FIG. 5, in accordance with an embodiment of the invention.

FIG. 8 illustrates different instruction pulses generated by the controller 250 in FIG. 5, in accordance with an embodiment of the invention. As shown in FIG. 5, the controller 250 generates instruction pulses/clock signals for target components 400. Input data is selectively passed into the target components 400 based on the state of the controller 250. For example, input data entering the controller 250 may be passed into processing logic associated with a target component 400 (i.e., presence of a clock pulse) or may not be passed (i.e., clock pulse is absent).

Figure 9:
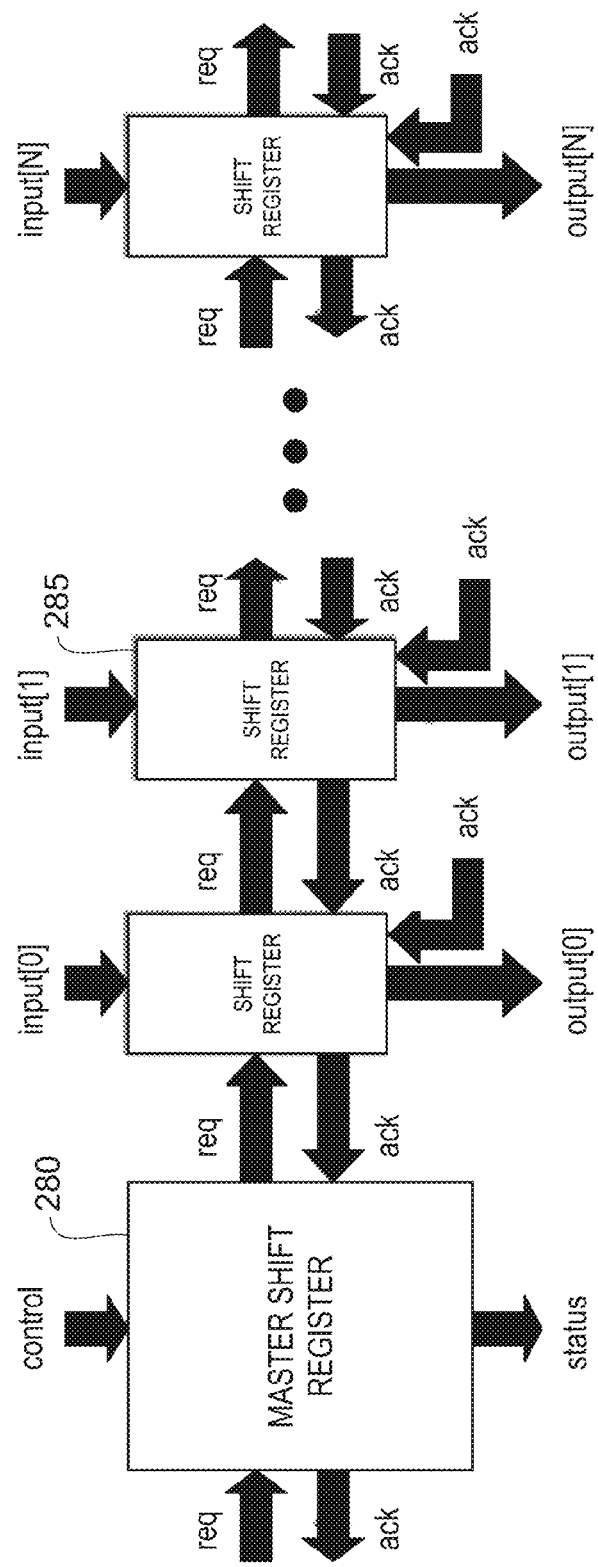
FIG. 9 illustrates a block diagram of the controller in FIG. 5, in accordance with an embodiment of the invention.

FIG. 9 illustrates a block diagram of the controller 250 in FIG. 5, in accordance with an embodiment of the invention. In one embodiment, the controller 250 generates instruction pulses for controlling asynchronous target components 400.

The controller 250 comprises a master shift register 280 and sequence of asynchronous shift registers 285. The master shift register 280 waits in an inactive state for a start control signal. Upon receiving the start control signal, the master shift register 280 sends a request req to a first shift register 285 of the sequence.

The request req communication may be interpreted as a token passing mechanism. Upon receiving the request req, the first shift register 285 samples input data (e.g., input[0]). Based on an internal state of the first shift register 285 and the input data sampled, the first shift register 285 either forwards the token to the next shift register 285 in the sequence by sending a request req to the next shift register 285, or requests execution of an instruction by initiating communication on an output[i], wherein output[i] denotes an instruction/trigger communication channel. The token may be passed down the sequence from one shift register 285 to another shift register 285 until the last shift register 285 of the sequence forwards the token back to the master shift register 280. An execution cycle is completed when the token is returned to the master shift register 380. Upon receiving the token back, the master shift register 280 returns to an inactive state and waits for another start control signal.

If the controller 250 receives another start control signal before a current execution cycle is completed, the master shift register 280 generates a status report that signals that an error has occurred. In case of an error, the master shift register 280 still allows for the previous iteration to complete and then signals 'error'. The 'error' signals needs to be acknowledged by one of the 'status' signals to continue the operations of the controller 250 (i.e., move onto the next iteration) by either an explicit acknowledge or by indirectly acknowledging using a delayed version of the 'error' signal.

When a shift register 285 requests execution of an instruction, the shift register 285 sends an instruction and/or a trigger signal (such as a clock) to a corresponding target component 400. The instruction initiates the target component 400 to execute a desired operation. Let output[i] denote an instruction/trigger communication channel from a shift register 285, wherein i is a positive integer. Each output[i] may or may not be directly connected to a corresponding target component 400, depending on the nature of the target component 400.

In one embodiment, each shift register 285 comprises an asynchronous circuit that utilizes quasi-delay insensitive principals. The shift registers 285 control the sequence of operations performed in the core circuit 100, thereby activating components 400 of the core circuit 400 only when necessary.

In one embodiment, the shift registers 285 implement a handshake protocol on each input/output. For example, when a shift register 285 sends an instruction pulse, the shift register 285 waits for an acknowledgement ack from a corresponding target component 400 on port 'output'.

In another embodiment, each shift register i may generate a signal that is converted into a sync_clk (using 'output[i]') to control synchronous target components 400.

Figure 10:
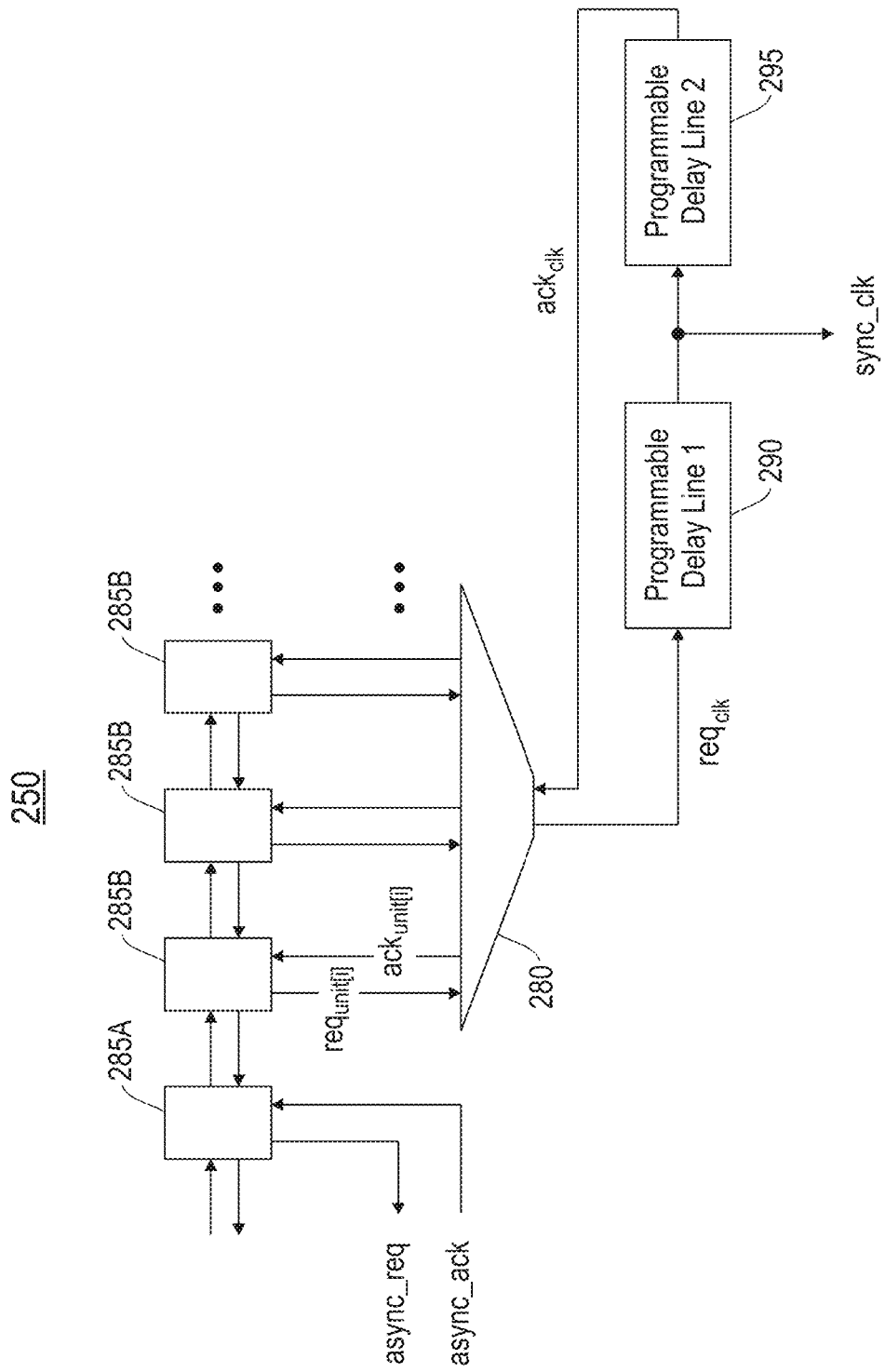
FIG. 10 illustrates a block diagram of the controller in FIG. 5, wherein the controller 250 controls both synchronous target components and asynchronous target components, in accordance with an embodiment of the invention.

FIG. 10 illustrates a block diagram of the controller 250 in FIG. 5, wherein the controller 250 controls both synchronous target components and asynchronous target components, in accordance with an embodiment of the invention. In one embodiment, one or more shift registers 285A handshake directly with asynchronous target components 400 (i.e., async_req, async_ack), while one or more shift registers 285B generate a trigger signal sync_clk for synchronous target components 400. For synchronous target components 400, each shift register 285B asserts a $req_{unit}[i]$ signal (i.e., a rising edge) through a logic path 280 implementing a REQ/ACK tree and through a first programmable delay element 290 to create a synchronous trigger signal sync_clk. The trigger signal sync_clk propagates through a second programmable delay element 295 that creates an acknowledge signal $ack_{clk}$. Upon receiving an asserted $ack_{unit}[i]$ signal, the shift register 285B deasserts the $req_{unit}[i]$ signal (i.e., falling edge) through the same logic path 280. When a deasserted $ack_{unit}[i]$ signal is received, the shift register 285 passes control (may be in a form of a token) to a next state (for example, next shifter element), thereby signaling that an entire synchronous execution cycle associated with this shifter element has been completed.

Figure 11:
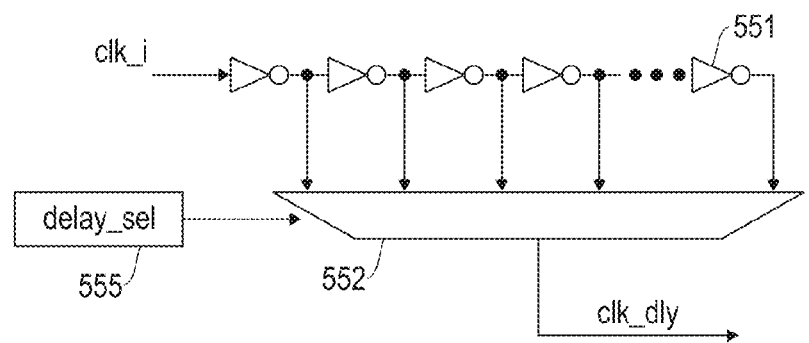
FIG. 11 illustrates an example programmable delay element, in accordance with an embodiment of the invention.

FIG. 11 illustrates an example programmable delay element 550, in accordance with an embodiment of the invention. The programmable delay element 550 comprises a sequence of inverters 551, wherein each inverter 551 has a fixed propagation delay. A total delay value is an integer multiple of the fixed propagation delay, wherein the total delay value depends on the number of inverters 551 that are passed through in a path.

The programmable delay element 550 further comprises a multiplexer 552 for receiving inputs, wherein each input corresponds to a delay path with a different number of inverters 551. The programmable delay element 550 further comprises a delay select unit 555 for generating a delay_sel signal that controls the multiplexer 552. The delay select unit 555 may be a register or a memory unit. A particular delay path and a total delay value is selected based on the delay_sel signal.

The first programmable delay element 290 and/or the second programmable delay element 295 may be implemented as the example programmable delay element 550 shown in FIG. 11.

Figure 12:
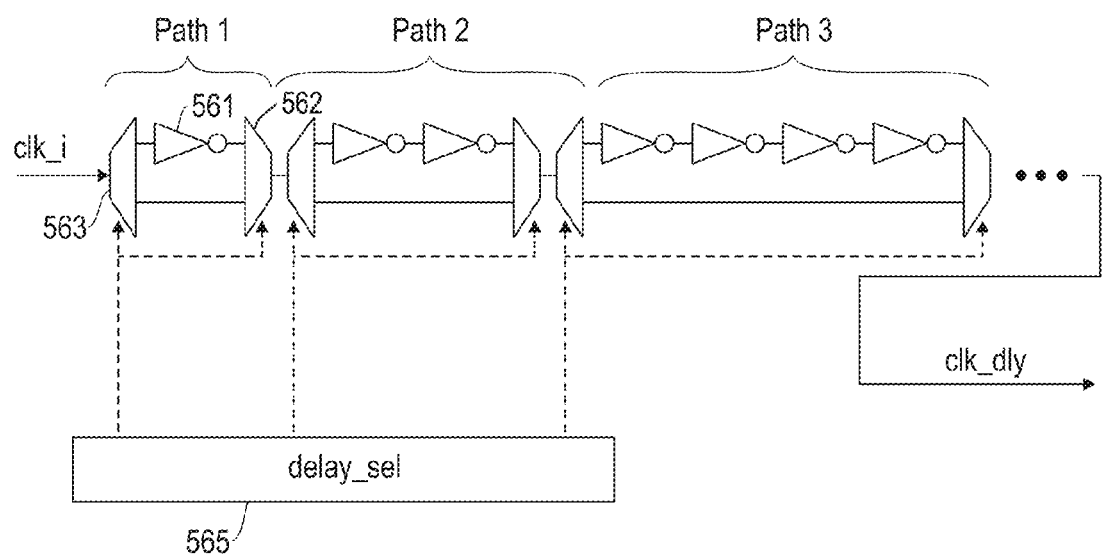
FIG. 12 illustrates another example programmable delay element, in accordance with an embodiment of the invention.

FIG. 12 illustrates another example programmable delay element 560, in accordance with an embodiment of the invention. The programmable delay element 560 comprises a sequence of demultiplxer/multiplexer pairs, wherein each demultiplxer/multiplexer represents a particular delay path (e.g., Path 1, Path 2, Path 3, etc.) with a different number of inverters 561. Specifically, each demultiplxer/multiplexer pair includes a first demultiplexer 563, a multiplexer 562, and at least one inverter 561. Each demultiplxer/multiplexer pair selects between a delay path with $2^n$ inverters or a skip path, wherein n is a positive integer. The programmable delay element 560 further comprises a delay select unit 565 for generating a delay_sel signal that controls the demultiplxer/multiplexer pairs. The delay select unit 565 may be a register or a memory unit. A particular delay path and a total delay value is selected based on the delay_sel signal.

The first programmable delay element 290 and/or the second programmable delay element 295 may be implemented as the example programmable delay element 560 shown in FIG. 12.

The controller 250 allows for asynchronous components and synchronous components to operate in the same environment. To transition from an asynchronous execution cycle to a synchronous execution cycle, output may be generated in the asynchronous target components 400 prior to the rising edge of $req_{unit}$, and data is consumed in the synchronous target components 400 on the rising edge of the trigger signal sync_clk. An acknowledge signal is generated based on the delay element to signal to the controller 250 that data/clock associated with a particular state-preserving element is consumed by the synchronous domain.

Figure 13:
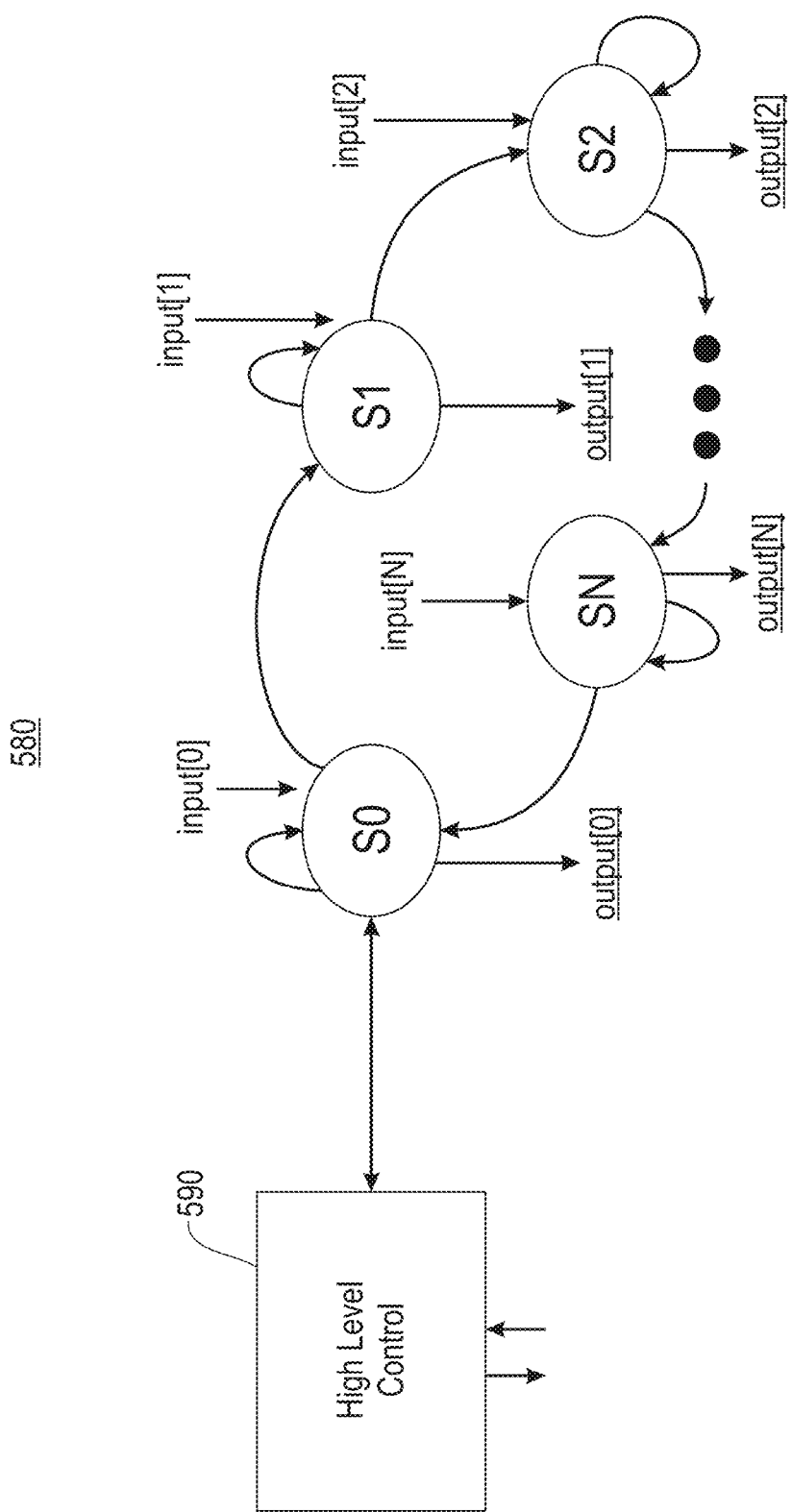
FIG. 13 illustrates an example event-driven finite state machine, in accordance with an embodiment of the invention.

FIG. 13 illustrates an example event-driven finite state machine 580, in accordance with an embodiment of the invention. The controller 580 comprising a high-level controller 590 for controlling system 'program execution'. Each execution cycle transitions between multiple states (e.g., states S0, S1, . . . , SN). Each instruction of a program generates (with some delay) an instruction pulse for advancing a program counter. Some instructions may halt the program execution until control signals are received that re-start the program execution. A desired operation is performed at the output[i] of each state.

Figure 14:
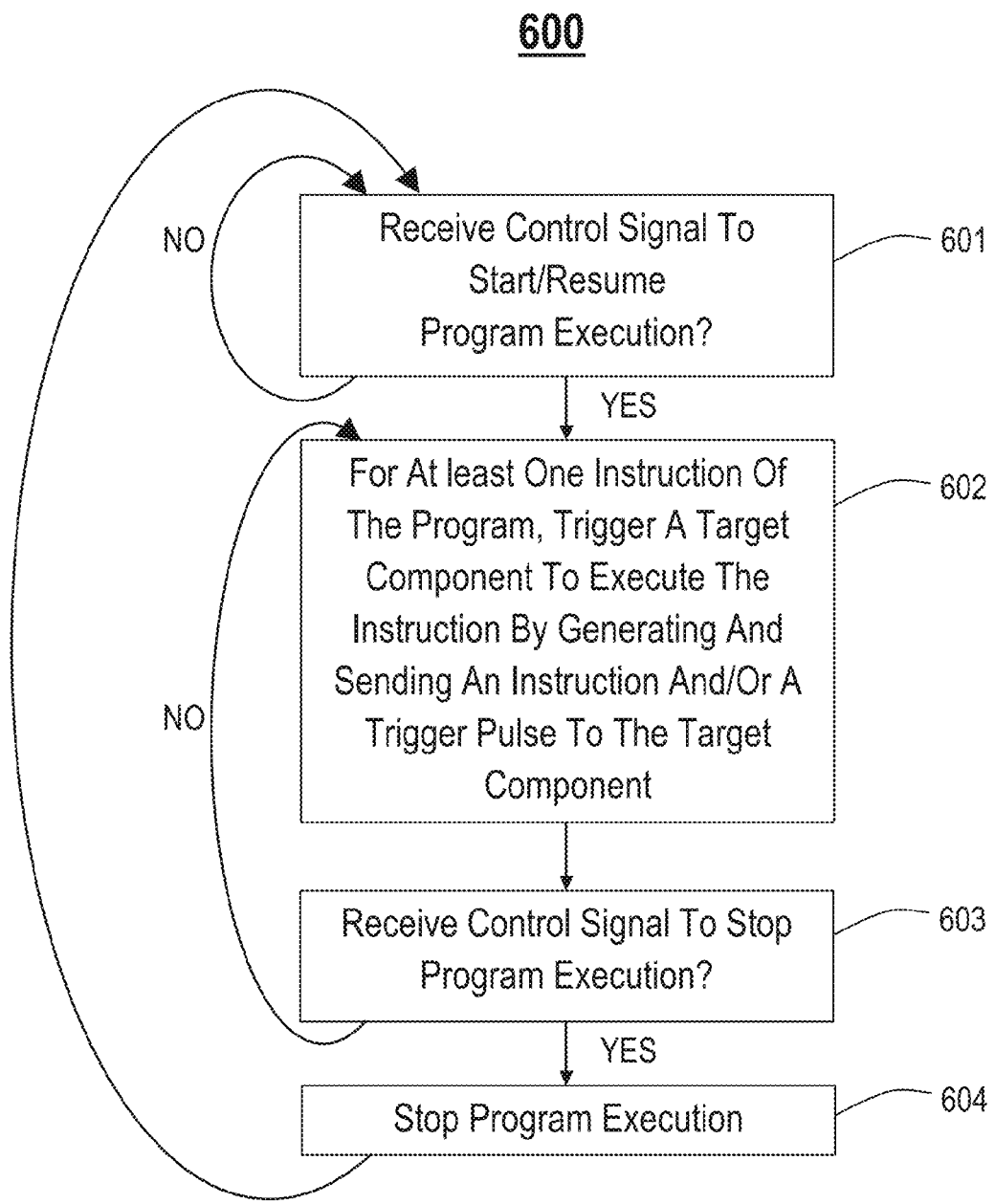
FIG. 14 illustrates a flowchart of an example process for controlling program execution via an event-based core controller including a set of state-preserving elements, in accordance with an embodiment of the invention.

FIG. 14 illustrates a flowchart of an example process 600 for controlling program execution via an event-based core controller including a set of state-preserving elements, in accordance with an embodiment of the invention. In process block 601, determine whether a control signal to start/resume program execution has been received. If a control signal to start/resume program execution has not been received, return to process block 601.

If a control signal to start/resume program execution has been received, proceed to process block 602. In process block 602, for at least one instruction of the program, trigger a target component to execute the instruction by generating and sending an instruction and/or a trigger pulse to the target component. In process block 603, determine whether a control signal to stop program execution has been received. If a control signal to stop program execution has not been received, return to process block 602.

If a control signal to stop program execution has been received, proceed to process block 604. In process block 604, stop program execution, and return to process block 601.

Figure 15:
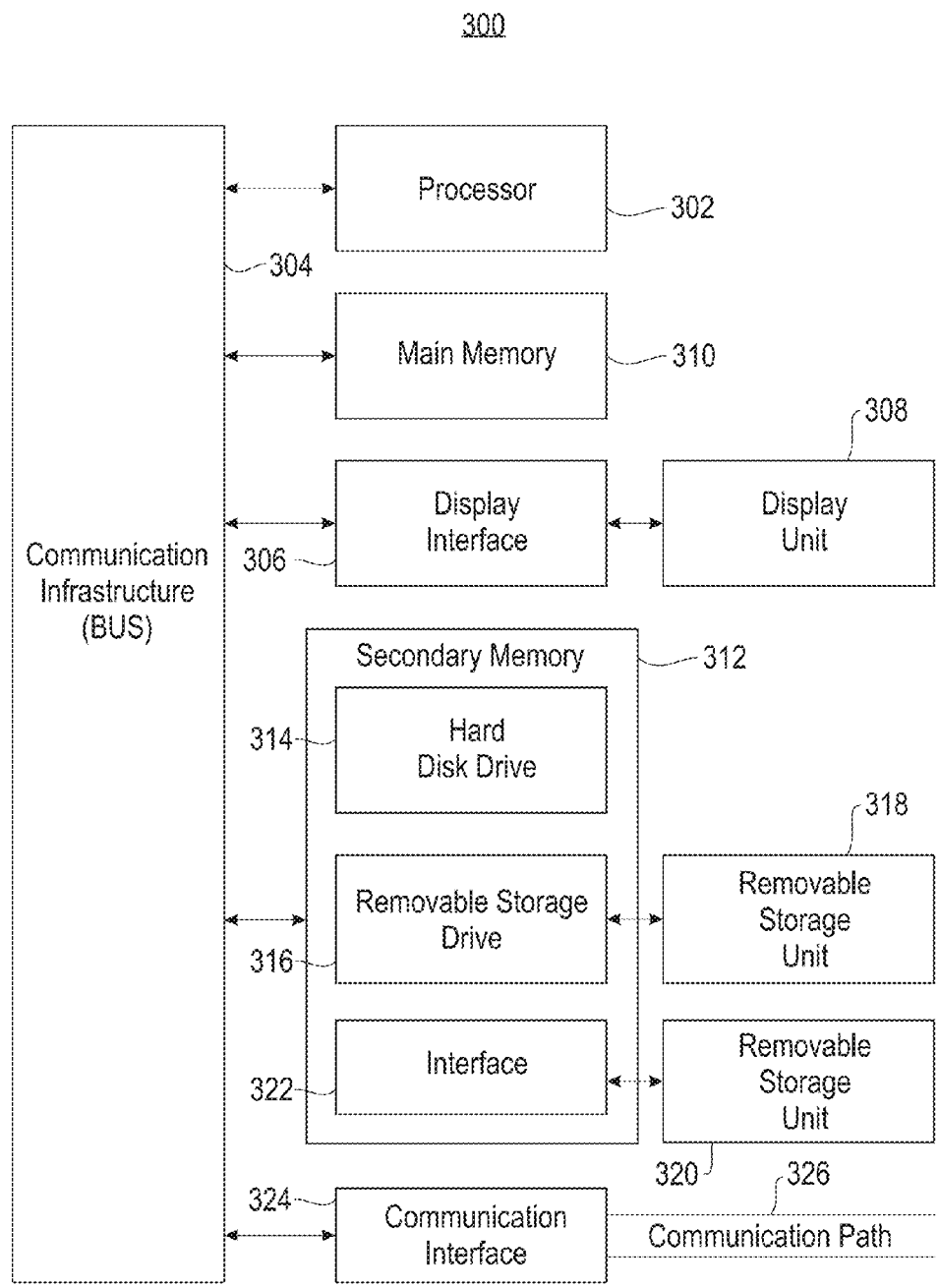
FIG. 15 is a high level block diagram showing an information processing system useful for implementing one embodiment of the invention.

FIG. 15 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for a implementing a self-timed, event-driven controller for a neurosynaptic core circuit. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for controlling program execution, comprising:
   an event-based core controller comprising:
   a set of state-preserving elements; and
   one or more asynchronous shift elements;
   wherein the core controller starts and stops execution of a program based on one or more control signals; and
   wherein, for each instruction of the program, the core controller triggers a target component to execute the instruction by generating and sending an instruction and/or a trigger pulse to the target component.

2. The system of claim 1, wherein each pulse has a corresponding duration based on a delay element.

3. The system of claim 2, wherein a duration of each pulse is programmable via the delay element.

4. The system of claim 1, wherein, for each instruction of the program, the core controller waits for an acknowledgement from a target component triggered to execute the instruction before resuming the execution of the program.

5. The system of claim 1, wherein one or more instructions of the program triggers the core controller to pause the execution of the program until the core controller receives a control signal to resume the execution of the program.

6. The system of claim 5, wherein the core controller generates a status report indicating an error when the core controller receives a control signal to restart the execution of the program before a previous program has completed execution.

7. The system of claim 1, wherein:
   the core controller controls multiple synchronous components; and
   the core controller controls the synchronous components via a clock signal.

8. The system of claim 1, wherein:
   the core controller controls multiple asynchronous components; and
   the core controller controls each asynchronous component via a request and acknowledge signal handshake.

9. The system of claim 1, wherein:
   the core controller controls multiple synchronous components and multiple asynchronous components;
   the core controller controls the synchronous components via a clock signal; and
   the core controller controls each asynchronous component via a request and acknowledge signal handshake.

10. The system of claim 1, wherein the program includes one or more instructions for updating neuronal states of multiple neurons.

11. The system of claim 1, wherein each target component is a component of a neurosynaptic core circuit.

12. A method for controlling program execution, comprising:
    starting and stopping execution of a program based on one or more control signals; and
    for each instruction of the program, triggering a target component to execute the instruction by generating and sending an instruction and/or a trigger pulse to the target component;
    wherein the execution of the program is controlled via an event-based core controller comprising:
    a set of state-preserving elements; and
    one or more asynchronous shift elements.

13. The method of claim 12, further comprising:
    for each instruction of the program, waiting for an acknowledgement from a target component triggered to execute the instruction before resuming the execution of the program.

14. The method of claim 12, further comprising:
    generating a status report indicating an error when a control signal to restart the execution of the program is received before a previous program has completed execution.

15. The method of claim 12, further comprising:
    controlling multiple synchronous components, wherein the synchronous components are controlled via a clock signal.

16. The method of claim 12, further comprising:
    controlling multiple asynchronous components, wherein each asynchronous component is controlled via a request and acknowledge signal handshake.

17. The method of claim 12, further comprising:
    controlling multiple synchronous components and multiple asynchronous components, wherein the synchronous components are controlled via a clock signal, and wherein each asynchronous component is controlled via a request and acknowledge signal handshake.

18. A computer program product for controlling program execution, the computer program product comprising a computer readable storage medium having program instructions embodied therewith, the program instructions executable by a computer to cause the computer to:
    start and stop execution of a program based on one or more control signals; and
    for each instruction of the program, trigger a target component to execute the instruction by generating and sending an instruction and/or a trigger pulse to the target component;
    wherein the execution of the program is controlled via an event-based core controller comprising:
    a set of state-preserving elements; and
    one or more asynchronous shift elements.

* * * * *